United States Patent [19]

Althoff

[11] 4,037,735
[45] July 26, 1977

[54] RECLAIMING AND STACKING SYSTEM

[75] Inventor: Heinz Althoff, White Plains, N.Y.

[73] Assignee: Fried, Krupp Gesellschaft mit beschrankter Haftung, Essen, Germany

[21] Appl. No.: 648,823

[22] Filed: Jan. 13, 1976

[51] Int. Cl.² .......................................... B65G 65/28
[52] U.S. Cl. ................................. 214/10; 198/508; 198/509; 198/518
[58] Field of Search ............... 214/10; 198/9, 12, 36, 198/45, 50, 51, 72, 73, 508, 509, 518

[56] References Cited

U.S. PATENT DOCUMENTS 3,586,152  6/1971  Austin ........................... 198/45 X

FOREIGN PATENT DOCUMENTS 1,229,913  12/1966  Germany ........................ 214/10

Primary Examiner—Albert J. Makay
Assistant Examiner—George F. Abraham
Attorney, Agent, or Firm—Spencer & Kaye

[57] ABSTRACT

A reclaiming and stacking system for conveying bulk material has an elongated yard conveyor for moving the bulk material in the longitudinal direction of the yard conveyor; a rail-mounted undercarriage straddling transversely the yard conveyor; first and second booms supported, at their respective inner ends, on the undercarriage. There are further provided first and second boom conveyors supported on and extending along the first and second booms, respectively; a bucket wheel supported at the outer end of the first boom for removing bulk material from a pile spaced from and along the yard conveyor and discharging it onto the first boom conveyor at the outer end thereof; a central chute supported within the outline of the undercarriage and having a discharge end oriented towards the yard conveyor; a first transfer arrangement for directly transferring bulk material from the inner end of the first boom conveyor to the inner end of the second boom conveyor; and a second transfer arrangement for transferring bulk material from the inner end of the first boom conveyor into the chute for deposition onto the yard conveyor.

6 Claims, 3 Drawing Figures

U.S. Patent     July 26, 1977     4,037,735
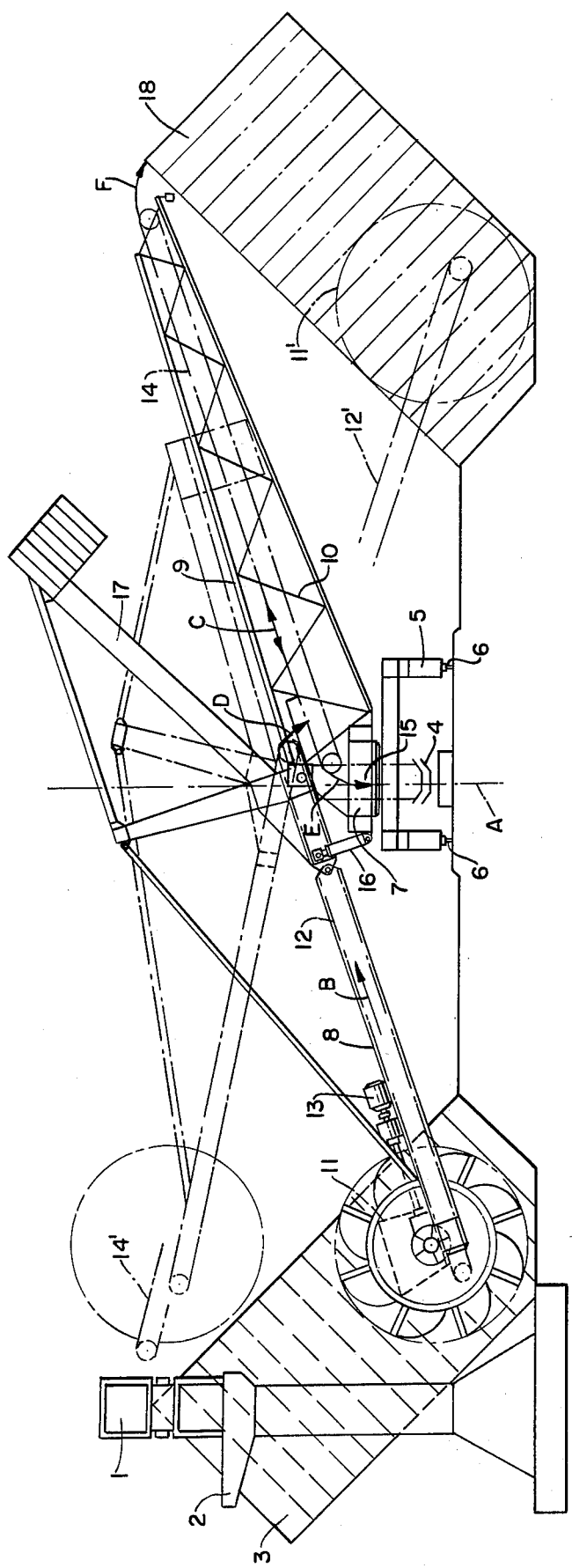
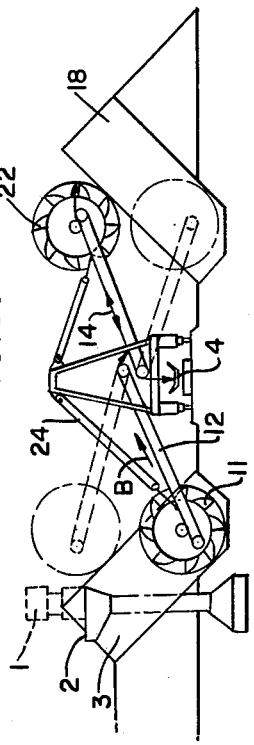
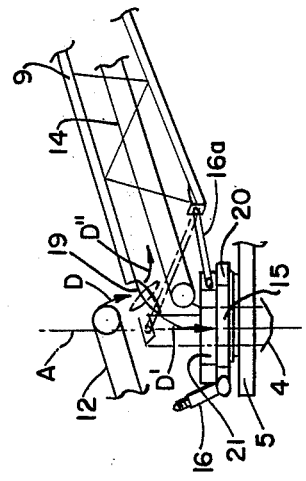

RECLAIMING AND STACKING SYSTEM

BACKGROUND OF THE INVENTION

This invention relates to a reclaiming and stacking system for handling bulk material, such as coal; it finds particular use in coal-fired power plants for moving the coal to its final point of utilization.

According to a known coal transporting system, the coal, stacked at a remote location in the plant area, is moved to a rail-mounted stacker/reclaimer apparatus by means of an upwardly sloping conveyor belt assembly forming part of a separate travelling tripper. From the latter, the coal is transferred to the boom belt of the stacker/reclaimer apparatus which stacks out the coal to form a coal pile on one side of a yard conveyor extending parallel with the rails under the stacker/reclaimer apparatus. The outer end of the boom is provided with a bucket wheel, by means of which coal can be reclaimed from the coal pile and conveyed by the reversible boom conveyor belt to the yard conveyor. The boom of the stacker/reclaimer is slewable (that is, rotatable about a vertical axis), so that coal supplied by the travelling tripper can also be stacked out on another pile on the other side of the yard conveyor. Thus, the stacker/reclaimer apparatus may retrieve material from either the one or the other pile by means of the slewable stacker and reclaimer boom and transfer the bulk material from the inner end of the boom conveyor to the yard conveyor. This system is, however, not adapted to directly transfer coal — in a single operation — from one coal pile to form a second coal pile on the other side of the yard conveyor.

In another known reclaiming and stacking system — as disclosed, for example, in German published patent application (Auslegeschrift) No. 1,299,913 — there is provided a rail-mounted apparatus and a ground-supported, reversible, yardbelt disposed between the rails and adapted to move coal either from a certain remote location to the apparatus or, when the belt travel direction is reversed, to convey coal from the apparatus to the same remote location. For this purpose, the upper reach of the reversible yard conveyor rises in the zone of the rail-mounted apparatus, forms a trigger loop, and then redescends to continue its course along the rails. The reversible yard conveyor has a lower reach which, throughout its course, extends at ground level beneath the upper reach. At all times — that is, regardless of the direction in which the reversible conveyor is driven — only that portion of the upper reach of the yard conveyor moves coal that is situated between the rail-mounted apparatus and one end of the reversible yard conveyor. The rail-mounted apparatus has a reclaimer boom and a stacker boom supported on a slew platform. The apparatus can perform essentially three types of operations: first, the coal or other bulk material transported on the reversible yard conveyor to the apparatus is, by gravity, transferred to the stacker belt and thus piles may be formed on the one and the other side of the apparatus rails by means of the slewable stacker boom. Second, coal from the piles can be reclaimed by a bucket wheel mounted at the outer end of the reclaimer boom. The material is transferred from the reclaimer conveyor to the reverisible yard conveyor on which then the material is transported towards the same location from which it had been earlier supplied to the apparatus for stacking. Third, material can be transferred from one pile on one side of the rails to the other pile on the other side of the rails by transferring material from the reclaimer conveyor onto the reversible yard conveyor and therefrom onto the stacker conveyor from the outer end of which the material is ejected to form a second pile. It is noted that this third operation must be considered as particularly uneconomical and energy-wasting because of the necessity of operating the reversible yard conveyor — which may have a length of thousands of feet — for a few feet of utilized length within the rail-mounted apparatus.

It is seen that in the precedingly described known system a yard conveyor with a travelling tripper is needed for transferring the material in all three types of the conveying operation.

According to another conventional coal moving method, coal is shipped from the coal mine in unit trains which have bottom-discharge box cars and which arrive on trestles in the power plant area. The coal is discharged from the box cars and thus a coal pile is formed beneath the trestles which extend along one side of a yard conveyor belt leading to the plant furnaces. A single-purpose reclaimer apparatus which runs on rails along the yard conveyor retrieves material from the coal pile at the trestles and deposits it onto the yard conveyor belt by gravity. If it is desired, for the purpose of increasing the live storage capacity, to build a second pile on the other side of the yard conveyor from the coal in the first pile under the trestles, a second, stacking apparatus has to be called in for cooperation with the single-purpose reclaimer to thus effect a transfer of the coal from the first pile to the second pile. The coal may then be reclaimed by the slewable single-purpose reclaimer from either the one or the other pile.

There is further known an excavator and stacking apparatus which comprises a crawler-mounted, slewable platform which supports an excavator boom provided at its outer end with a bucket wheel, as well as a stacker boom. Between the discharge end of the excavator belt and the charging end of the stacker belt there is provided a transfer belt for transferring material within the apparatus, from the excavator belt to the stacker belt. This known apparatus is concerned exclusively with the stacking of excavated material in a single operation by transferring the excavated material from the excavator belt to a transfer belt and from the transfer belt to the stacker belt. There is no provision of a yard conveyor cooperating with and disposed beneath the apparatus; such an arrangement would further not be feasible since the excavator/stacker apparatus does not move in a fixed path.

SUMMARY OF THE INVENTION

It is an object of the invention to provide an improved and simplified reclaiming and stacking system particularly for handling coal deposited on a pile on one side of a yard conveyor which leads to a point of utilization, such as the fuel charging point of a coal-fired power plant.

It is a further object of the invention to provide an improved transfer apparatus of simplified unitary structure which is adapted to reclaim coal deposited on one side of a yard conveyor belt and to selectively deposit the coal either on the yard conveyor belt or on the other side of the yard conveyor belt, thus building a second coal pile.

These objects and others to become apparent as the specification progresses, are accomplished by the invention according to which, briefly stated, the reclaiming and stacking system for conveying bulk material has an elongated yard conveyor for moving the bulk material in the longitudinal direction of the yard conveyor; a rail-mounted undercarriage straddling transversely the yard conveyor; first and second booms supported, at their respective inner ends, on the undercarriage. There are further provided first and second boom conveyors supported on and extending along the first and second booms, respectively; a bucket wheel supported at the outer end of the first boom for removing bulk material from a pile spaced from and along the yard conveyor and discharging it onto the first boom conveyor at the outer end thereof; a central chute supported within the outline of the undercarriage and having a discharge end oriented towards the yard conveyor; a first transfer arrangement for directly transferring bulk material from the inner end of the first boom conveyor to the inner end of the second boom conveyor; and a second transfer arrangement for transferring bulk material from the inner end of the first boom conveyor into the chute for deposition onto the yard conveyor.

BRIEF DESCRIPTION OF THE DRAWINGS

FIG. 1 is a schematic side elevational view of a preferred embodiment of a reclaimer/stacker apparatus forming part of the reclaiming and stacking system according to the invention.

FIG. 2 shows a modified detail of FIG. 1.

FIG. 3 is a schematic side elevational view of another preferred embodiment of a reclaimer/stacker apparatus according to the invention.

DESCRIPTION OF THE PREFERRED EMBODIMENTS

Turning now to FIG. 1, the reclaiming and stacking system structured according to the invention finds most advantageous application in coal-fired power plant areas to which coal is shipped, for example, directly from a mine, by unit trains formed of a number of bottom-discharge box cars 1. At its destination point in the plant area, the unit train is on trestles 2; the coal is discharged from the box cars 1 to form a coal pile 3 at the trestles 2.

A yard conveyor 4, extending parallel-spaced with respect to the trestles, leads, in a direction perpendicular to the plane of the drawing, to the fuel charging point of the power plant.

The yard conveyor 4 is straddled by a portal or undercarriage 5 of a reclaimer/stacker, movable mounted on rails 6 which extend parallel on both sides of the yard conveyor 4. The yard conveyor 4 expediently extends from the remotest possible end of the pile 3 to the fuel charging point, while the rails 6 extend along the maximum possible length of the pile 3.

A slew platform 7 is mounted on the undercarriage 5 for rotation about a vertical axis A and supports a reclaimer boom 8 and a stacker boom 9 at their respective inner ends. In this embodiment, the booms 8 and 9 extend from the slew platform 7 in opposite directions and are slewable as a unit.

Both booms may have a conventional girder structure as indicated at 10 for the stacker boom 9.

The reclaimer boom 8 carries at its outer end a bucket wheel 11 with which the piled coal is reclaimed and loaded on a reclaimer belt 12 supported on and running along the reclaimer boom 8. The bucket wheel 11 is driven by a drive motor 13. The travelling direction of the reclaimer belt 12 is indicated by the arrow B.

The stacker boom 9 has a stacker belt 14 which is supported on and running along the stacker boom 9. The stacker belt 14 is reversible as indicated by the double-headed arrow C for reasons to be discussed below.

The reclaimer/stacker further comprises a central chute 15 which leads from beneath the inner end of the stacker conveyor 14 downwardly and terminates above the yard conveyor 4.

Both the reclaimer boom 8 and the stacker boom 9 may be provided with a mechanism for effecting a swinging motion of the booms in a vertical plane independently from one another. Such a mechanism is symbolically indicated at 16 for the reclaimer boom 8. Further, the reclaimer boom 8 may be conventionally provided with a counterweight boom 17 for balancing purposes.

In the description which follows, the operation of the system illustrated in FIG. 1 will be explained.

In a first operation mode, coal is reclaimed from pile 3 and transferred to the yard conveyor 4 for advancing the coal to the fuel charge point of the power plant. For this purpose, the coal retrieved by the bucket wheel 11 is loaded on the reclaimer belt 8, conveyed in the direction of arrow B and then discharged, as indicated by the arrow D, onto the stacker belt 14. In this operational mode the stacker belt 14 is so driven that its upper reach — that is, the reach onto which the coal is transferred from the reclaimer belt 12 — runs towards the left, that is, towards the center of the reclaimer/stacker apparatus. Thereafter, the coal is discharged from the stacker belt 14 into the chute 15 as indicated by the arrow E. From the chute 15 the coal then falls on the yard belt 4.

As known, the rate of coal supply to the pile 3 and the rate of consumption resulting in a removal of coal from the pile 3 may deviate significantly. For example, there may occure a plant shutdown of a few days, while, for the same period, new coal arrival is scheduled to further increase the pile 3. Since, at the same time, no removal from the pile 3 onto the yard conveyor 4 takes place, the pile 3 may reach capacity volume. Thus, for leaving further coal delivery schedules undisturbed, it is necessary to increase the live storage capacity of the power plant area. For this purpose, the reclaimer and stacker system designed according to the invention and illustrated in FIG. 1 works in the second operational mode. In this operational mode, a second coal pile 18 is formed on that side of the yard conveyor 4 which is opposite from where the first pile 3 had been formed.

In the second operational mode the bucket wheel 11, as in the first operational mode, deposits the coal retrieved from the pile 3 onto the reclaimer belt 8 and then the coal is discharged at D onto the reversible stacker belt 14. Contrary to the first operational mode, however, the reversible stacker belt 14 is now operated that its upper reach moves towards the right. As a result, the coal deposited onto the upper reach of the stacker belt 14 from the reclaimer belt 8 exits at the outer end of the stacker belt 14 and is discharged, as indicated at the arrow F, to form the second pile 18. In this manner, the volume of the pile 3 is reduced to permit the deposition thereon of fresh loads from the unit trains arriving on the trestles 2. The formation of the second coal pile is further advantageous for the reverse event, that is, when — for example, because of a strike — coal supply temporarily stops, whereas coal consumption continues.

In case two coal piles 3 and 18 exist on either side of the yard conveyor 4, it will be apparent that, with the first operational mode, coal can be transferred to the yard conveyor belt either from the coal pile 3 or, after rotating the reclaimer boom 180° to be operative on the other side of the yard conveyor, from the second coal pile 18. For this latter operation, the bucket wheel 11 and the reclaimer belt 12 will operate at the right side (as viewed in FIG. 1) of the yard conveyor 4 as indicated with phantom lines at 11' and 12'. Similarly, the stacker conveyor 14 will assume a position at 14' on the left side of the yard conveyor 4. It is noted that in its position 14' the stacker boom may be used to discharge coal onto the pile 3 which may be desirable in some instances.

Turning now to FIG. 2, there are shown two modifications of the reclaimer/stacker of FIG. 1.

As a first modification, between the vertically spaced inner ends of the reclaimer belt 12 and the stacker belt 14 there is provided a pivotally supported deflector gate 19 which has a first and a second position. The deflector gate 19 is set into its first position (shown in solid lines in FIG. 2) for the above-described first mode of operation, that is, for transferring coal from the pile 3 or 18 to the yard conveyor 4. In this first position of the deflector gate 19 the coal discharged from the reclaimer belt 12 at D is directed by the deflector gate 19 into the chute 15 in the direction of arrow D'. It is seen that while for this operational mode the FIG. 1 embodiment needed the operation of the stacker belt 14, the use of the deflector gate 19 according to the FIG. 2 modification entirely circumvents the stacker belt 14 and thus for the first mode of operation its participation is not needed. When the reclaimer/stacker is to work in the second operational mode, that is, the second coal pile 18 is to be formed from the first pile 3, the deflector gate 19 is rotated to assume its phantom-line position shown in FIG. 2. In this case, the coal discharged from the reclaimer belt 12 at D is directed by the deflector gate 19 in the direction of arrow D" onto the stacker belt 14 which is now driven in such a manner that its upper reach moves towards the right, that is, away from the center of the apparatus.

In accordance with a second modification of the FIG. 1 structure, as seen in FIG. 2, on the portal 5 there are provided two superposed slew platforms 20 and 21. The two platforms are rotatable independently of and with respect to one another about the vertical axis A. The reclaimer boom 8 (not shown in FIG. 2) is supported on the slew platform 20, while the stacker boom 9 is supported on the slew platform 21. This arrangement provides a separate and relative swinging motion of the reclaimer boom 8 and the stacker boom 9 which further increases the flexibility of the system. The stacker boom 9 may be raised or lowered in a vertical plane by a mechanism 16a similar to the mechanism 16 associated with the reclaimer boom 8.

FIG. 3 illustrates a second preferred embodiment of the reclaimer/ stacker forming part of the system designed according to the invention. In this embodiment, the slew platform is replaced by a rigid, fixed mast structure 23 for supporting the two booms on the undercarriage 5. To ensure, however, a versatility which is similar to that of the structure illustrated in FIG. 1, the stacker boom is, similar to the reclaimer boom, provided with a bucket wheel, here designated at 22. Thus, in the first operational mode, when coal is to be transferred from the pile 3 to the yard conveyor 4, the reclaimer belt 12 is operative. If, in turn, coal is to be retrieved from the coal pile 18 and deposited on the yard conveyor 4, the belt 14 will function as a reclaiming belt. In the second operational mode, that is, when a second coal pile 18 is to be formed from the coal pile 3, the boom 9 and its associated belt 14 will function, as in the FIG. 1 embodiment, as a stacker structure. It is seen that by providing a bucket wheel at the outer end of both booms, no slew structure is necessary, thus resulting in a further simplification of the rail-mounted apparatus. The mechanism for moving the booms in a vertical plane are indicated, respectively, at 24 and 25.

It will be understood that the above description of the present invention is susceptible to various modifications, changes and adaptations, and the same are intended to be comprehended within the meaning and range of equivalents of the appended claims.

What is claimed is:

1. A reclaiming and stacking system for conveying bulk material, comprising in combination:
   a. an elongated yard conveyor for moving the bulk material in the longitudinal direction of the yard conveyor;
   b. a rail-mounted undercarriage straddling transversely said yard conveyor;
   c. first and second booms each having an inner end and an outer end;
   d. means for supporting said first and second booms on said undercarriage at said inner ends;
   e. first and second boom conveyors supported on and extending along said first and second booms, respectively, each boom conveyor having inner and outer ends;
   f. a bucket wheel supported at said outer end of said first boom for removing bulk material from a pile spaced from and along said yard conveyor and discharging it onto said first boom conveyor at the outer end thereof;
   g. a central chute supported in the zone of said undercarriage and having a discharge end oriented towards said yard conveyor;
   h. the adjacent inner ends of the first and second boom conveyors being located so as to define a direct, unobstructed first path for the bulk material from the inner end of said first boom conveyor to the inner end of said second boom conveyor for providing a transfer of the bulk material by gravity directly from the first boom conveyor to the second boom conveyor; and
   i. transfer means operable to define a second path for transferring bulk material from the inner end of said first boom conveyor into said chute for deposition onto said yard conveyor.

2. A reclaiming and stacking system as defined in claim 1, wherein said means for supporting said booms includes a slew platform mounted on said undercarriage for rotation about a vertical axis; said boom being mounted on said slew platform to be rotatable about said vertical axis as a unit.

3. A reclaiming and stacking system as defined in claim 1, wherein said first path is defined by the arrangement of said inner end of said first boom conveyor above said inner end of said second boom conveyor.

4. A reclaiming and stacking system as defined in claim 3, wherein said second boom conveyor is reversible and said second path is defined by the arrangement of said inner end of said second boom conveyor above an inlet of said central chute for transferring bulk material by gravity from said second boom conveyor onto said yard conveyor via said central chute.

5. A reclaiming and stacking system for conveying bulk material, comprising in combination:
   a. an elongated yard conveyor for moving the bulk material in the longitudinal direction of the yard conveyor;
   b. a rail-mounted undercarriage straddling transversely said yard conveyor;
   c. first and second booms each having an inner end and an outer end;
   d. two superposed slew platforms mounted on said undercarriage for relative rotation with respect to one another about a vertical axis; one of said booms being mounted, in the zone of its inner end, on one slew platform and the other of said booms being mounted, in the zone of its inner end, on the other slew platform to be rotatable with respect to one another about said vertical axis;
   e. first and second boom conveyors supported on and extending along said first and second booms, respectively, each boom having inner and outer ends;
   f. a bucket wheel supported at said outer end of said first boom for removing bulk material from a pile spaced from and along said yard conveyor and discharging it onto said first boom conveyor at the outer end thereof;
   g. a central chute supported in the zone of said undercarriage and having a discharge end oriented towards said yard conveyor;
   h. first transfer means for directly transferring bulk material from the inner end of said first boom conveyor to the inner end of said second boom conveyor; and
   i. second means for transferring bulk material from the inner end of said first boom conveyor into said chute for deposition onto said yard conveyor.

6. A reclaiming and stacking system for conveying bulk material, comprising in combination:
   a. an elongated yard conveyor for moving the bulk material in the longitudinal direction of the yard conveyor;
   b. a rail-mounted undercarriage straddling transversely said yard conveyor;
   c. first and second booms each having an inner end and an outer end;
   d. means for supporting said first and second booms on said undercarriage at said inner ends;
   e. first and second boom conveyors supported on and extending along said first and second booms, respectively, each boom conveyor having inner and outer ends;
   f. a bucket wheel supported at said outer end of first boom for removing bulk material from a pile spaced from and along said yard conveyor and discharging it onto said first boom conveyor at the outer end thereof;
   g. a central chute supported in the zone of said undercarriage and having a discharge end oriented towards said yard conveyor;
   h. first transfer means for directly transferring bulk material from the inner end of said first boom conveyor to the inner end of said second boom conveyor;
   i. second transfer means for transferring bulk material from the inner end of said first boom conveyor into said chute for deposition onto said yard conveyor; and
   j. an additional bucket wheel mounted on said outer end of said second boom for removing bulk material stacked at a distance from and along said yard conveyor and discharging it onto said second boom conveyor at the outer end thereof; said second boom conveyor being reversible; and said means for supporting said first and second booms including a fixed mast structure connected to said booms and said undercarriage.

* * * * *